US009564812B2

United States Patent
Joo et al.

(10) Patent No.: US 9,564,812 B2
(45) Date of Patent: Feb. 7, 2017

(54) POWER SUPPLY DEVICE AND METHOD FOR SUPPLYING POWER TO THE ELECTRONIC DEVICE

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/794,909

(22) Filed: Jul. 9, 2015

(65) Prior Publication Data

US 2016/0028315 A1    Jan. 28, 2016

(30) Foreign Application Priority Data

Jul. 23, 2014    (KR) ........................ 10-2014-0093204

(51) Int. Cl.
*H02M 3/335*    (2006.01)
*H02M 1/36*    (2007.01)
*H02J 9/00*    (2006.01)
*H02M 1/00*    (2006.01)

(52) U.S. Cl.
CPC ........... *H02M 3/33507* (2013.01); *H02M 1/36* (2013.01); *H02J 9/005* (2013.01); *H02M 2001/008* (2013.01)

(58) Field of Classification Search
CPC .................................................. H02M 3/335
USPC ... 323/285; 363/18, 19, 21.06, 21.07, 21.14, 363/21.15, 21.16, 24–28, 56.06–56.08, 363/65, 69, 70, 71, 74, 76, 79, 80, 363/82, 84, 89, 90, 131, 134
See application file for complete search history.

(56) References Cited

U.S. PATENT DOCUMENTS

| 6,400,589 B2 * | 6/2002 | Abo ...................... H02J 7/0065 323/267 |
| 6,462,965 B1 * | 10/2002 | Uesono ............. H02M 3/33592 363/21.14 |
| 6,671,194 B2 * | 12/2003 | Takahashi ............... H02M 1/36 363/65 |
| 7,433,208 B2 * | 10/2008 | Nishida ............... H02M 3/3381 363/19 |
| 7,616,464 B2 * | 11/2009 | Phadke ............. H02M 3/33576 323/285 |

(Continued)

FOREIGN PATENT DOCUMENTS

| KR | 200275153 Y1 | 5/2002 |
| KR | 1020090128101 A | 12/2009 |
| KR | 1020100033570 A | 3/2010 |

*Primary Examiner* — Adolf Berhane
*Assistant Examiner* — Nusrat Quddus
(74) *Attorney, Agent, or Firm* — Sughrue Mion, PLLC

(57) ABSTRACT

An apparatus and method for supplying power to an electronic device are provided. The apparatus includes a power converter, a main converter, and a sub converter. The power converts includes a rectifier configured to convert alternating current (AC) power into direct current (DC) power, and a smoothing condenser connected to an output terminal of the rectifier. The main converter is connected with an output terminal of the power converter and configured to supply power to a first component of the electronic device. The sub converter is connected with the output terminal of the power converter, and configured to supply power to components other than the first component, and to stop supplying the power in response to a momentary power interruption or a voltage dip occurring in the AC power.

15 Claims, 6 Drawing Sheets

(56) References Cited

U.S. PATENT DOCUMENTS

2015/0131334 A1\* 5/2015 Saji .................. H02M 1/36
363/21.01

\* cited by examiner

POWER SUPPLY DEVICE AND METHOD FOR SUPPLYING POWER TO THE ELECTRONIC DEVICE

CROSS-REFERENCE TO RELATED APPLICATION

This application claims priority from Korean Patent Application No. 10-2014-0093204, filed on Jul. 23, 2014 in the Korean Intellectual Property Office, the disclosure of which is incorporated by reference herein in its entirety.

BACKGROUND

Field

Apparatuses and methods consistent with the exemplary embodiments relate to supplying power, and more particularly to supplying power, which can reduce an effect of a momentary power interruption or a voltage dip of input alternating current (AC) power and decrease damage to components.

Description of the Related Art

An electronic device such as a television (TV) operates by receiving power from an internal or external power supply. The TV includes a main component such as a main controller, and a plurality of sub components such as a backlight, an audio reproducer, etc. In general, when there is a momentary power interruption or a voltage dip in the power, various components may be reset. In particular, if the voltage applied to the main component such as the main controller is interrupted, it is inconvenient since the electronic device itself is reset. This disadvantage may be alleviated somewhat by employing a smoothing condenser. However, as the power consumption of the main component and sub components increases, the capacitance of the smoothing condenser also increases, which in turn increases cost.

SUMMARY

One or more exemplary embodiments provide a method and apparatus for supplying power, which can reduce the effect of a momentary power interruption or a voltage dip even though a smoothing condenser with a low specification is used.

Further, one or more exemplary embodiments provide a method and apparatus for supplying power, which can minimize damage to components due to a momentary power interruption or a voltage dip.

According to an aspect of an exemplary embodiment, there is provided an apparatus for supplying power to an electronic device, the apparatus including a power converter including a rectifier configured to convert alternating current (AC) power into direct current (DC) power, and a smoothing condenser connected to an output terminal of the rectifier; a main converter that is connected with an output terminal of the power converter and configured to supply power to a first component of the electronic device; and at least one sub converter that is connected with the output terminal of the power converter, and configured to supply power to components other than the first component, and to stop supplying the power in response to a momentary power interruption or a voltage dip occurring in the AC power.

The main converter may be supplied with voltage charged in the smoothing condenser in response to the momentary power interruption or the voltage dip occurring in the AC power.

The at least one sub converter may include a transformer configured to transform an output voltage of the power converter; a switch configured to switch on and off the transformer; and a control integrated circuit (IC) configured to control the switch.

The control IC may be configured to change to a low state in response to the momentary power interruption or the voltage dip occurring in the AC power.

The apparatus may further include a dip-detection controller configured to detect whether the momentary power interruption or the voltage dip occurs in the AC power, and to switch the input power of the control IC of the sub converter to a low state in response to detecting that the momentary power interruption or the voltage dip occurs in the AC power.

The apparatus may further include a dip-detection controller that is configured to detect whether the momentary power interruption or the voltage dip occurs in the AC power, and to switch off the input power of the control IC of the sub converter to turn off the sub converter in response to detecting that the momentary power interruption or the voltage dip occurs in the AC power.

According to an aspect of another exemplary embodiment, there is provided a method including rectifying input alternating current (AC) power into direct current (DC) power; supplying rectified voltage to a first component of the electronic device; supplying the rectified voltage to components of the electronic device other than the first component; and stopping the supply of the rectified voltage to the components other than the first component in response to detecting a momentary power interruption or a voltage dip occurring in the AC power.

The rectifying may include charging a smoothing condenser, and the method may further include supplying the voltage charged in the smoothing condenser to the first component of the electronic device in response to the momentary power interruption or the voltage dip occurring in the AC power.

The supplying the rectified voltage to the components other than the first component may include transforming the rectified voltage to a voltage supplied to the components other than the first component using a transformer; and the stopping the supply includes controlling a switch to switch on and off the transformer according to whether the momentary power interruption or the voltage dip occurs in the AC power.

The switch may be controlled to switch off the transformer in response to the momentary power interruption or the voltage dip occurring in the AC power.

The method may further include detecting whether the momentary power interruption or voltage dip occurs in the AC power, and stopping the supply includes switching off input power of a control IC that supplies the rectified voltage to the components other than the first component in response to detecting that the momentary power interruption or the voltage dip occurs in the AC power.

According to an aspect of another exemplary embodiment, there is provided an apparatus for supplying power to an electronic device, the apparatus including a power converter; a main converter that is connected to an output terminal of the power converter and configured to supply power to a main component of the electronic device; and at least one sub converter that is connected to the output terminal of the power converter, and configured to supply power to a sub component of the electronic device, wherein during a momentary power interruption in power supplied from the power converter to the main converter and the at least one sub converter, the main converter is configured to supply power to the main component while the at least one sub converter stops supplying power to the sub component.

The momentary power interruption may include a dip in an output voltage of the power converter.

The power converter may include a smoothing condenser configured to store power produced by power converter, and during the momentary power interruption, the main converter is configured to supply power stored in the smoothing condenser to the main component.

The at least one sub converter may include a control integrated circuit (IC) configured to control the supply of power to the sub component, and to detect the momentary power interruption.

In response to the control IC detecting the momentary power interruption, the control IC may enter a low state to stop supplying power to the sub component.

The apparatus may further include a dip-detection controller configured to detect the momentary power interruption, wherein the at least one sub converter includes a control integrated circuit (IC) configured to control the supply of power to the sub component, and wherein in response to the dip-detection controller detecting the momentary power interruption, the dip-detection controller is configured to control the control IC to stop supplying power to the sub component.

The dip-detection controller may be configured to control the control IC to stop supplying power to the sub component by setting the control IC to a low state.

The dip-detection controller may be configured to control the control IC to stop supplying power to the sub component by turning off power to the control IC.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following exemplary embodiments describe only configurations directly related to the present inventive concept, and the descriptions the other configurations will be omitted for clarity and concision. However, it will be understood that additional components and configurations may be provided in realizing an apparatus or system to which the inventive concept is applied. Further, like numerals refer to like elements throughout.

Figure 1:
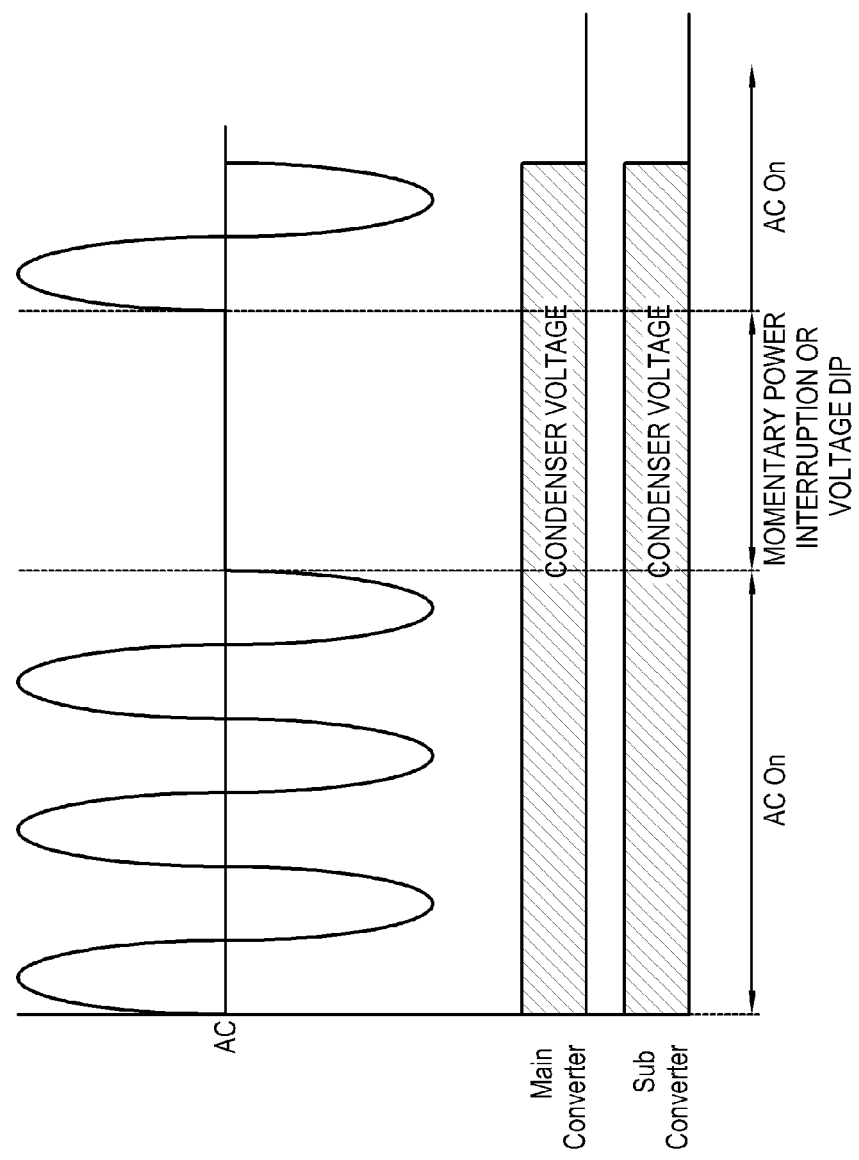
FIG. 1 is a view showing a waveform of AC power and operations of respective converters of a power supply.

FIG. 1 illustrates a momentary power interruption or a voltage dip in AC power. As shown in FIG. 1, generally AC power supplied to a power supply may have a momentary power interruption or a voltage dip, and therefore various components may be reset. In particular, if the voltage applied to a main component of an electronic device is interrupted, the electronic device itself may be reset. A smoothing condenser may be used to prevent components from being reset. However, as a smoothing condenser supplies the voltage charged therein to a larger number of components, a capacitance of the smoothing condenser must be increased in order to store more power to supply the power to the larger number of components. However, larger capacitors having higher capacitance are more expensive, thus increasing the cost. Moreover, often a power supply may include a power factor corrector (PFC) or other components for efficiently using the power. As the capacitance of a smoothing condenser increases, an inrush current at the time of the momentary power interruption or the voltage dip becomes greater, thereby damaging the power factor corrector (PFC) or other such components. In some cases, the components may be protected by over-specifying the components to handle the larger inrush current. But, this increases the costs of the components, thus increasing the cost of the electronic device.

According to various exemplary embodiments, a power supply may be applied to a display apparatus, a computer, an audio system, or a variety of similar electronic devices that include a plurality of components. Below, the display apparatus will be described by way of example without limitation.

Figure 2:
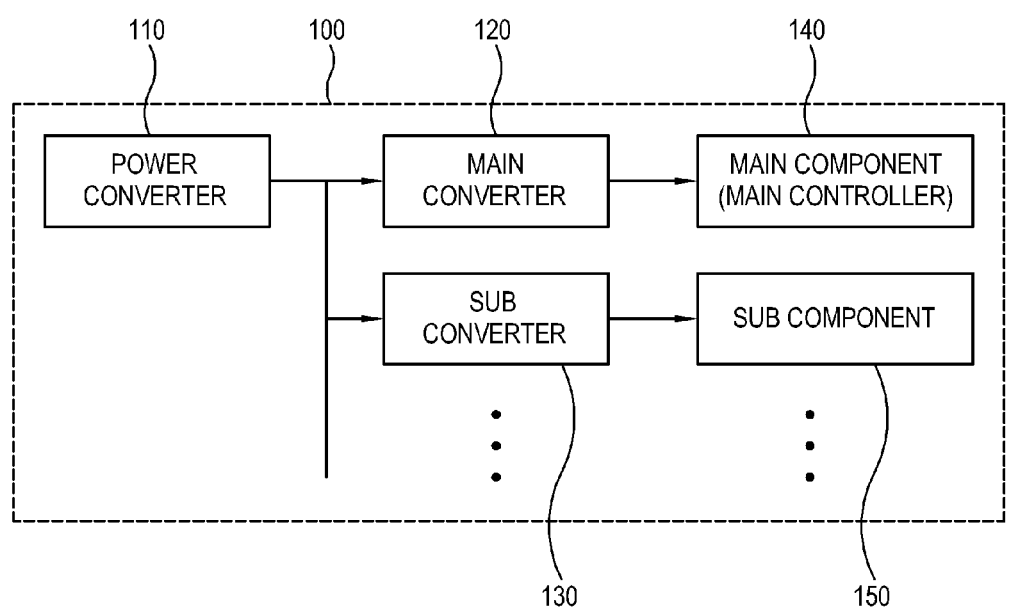
FIG. 2 is a block diagram of a power supply according to an exemplary embodiment.
Figure 3:
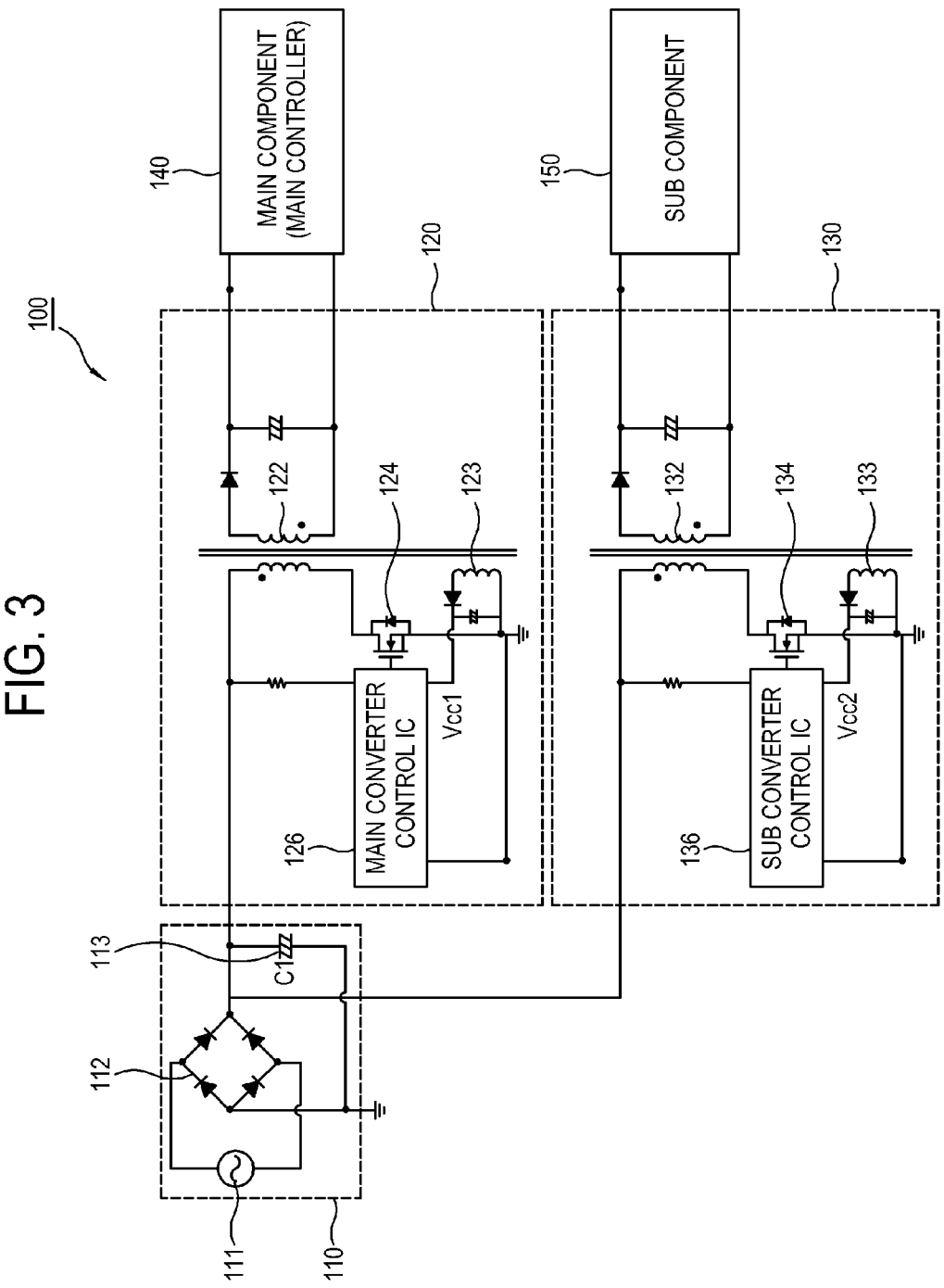
FIG. 3 is a circuit diagram of the power supply of FIG. 2, according to a first exemplary embodiment.

FIG. 2 is a block diagram of a power supply according to an exemplary embodiment. As shown in FIG. 3, a power supply 100 may include a power converter 110, a main converter 120 for supplying power to a main component 140 of the display apparatus, and a sub converter 130 for supplying power to a sub component 150 of the display apparatus. FIG. 2 shows only one sub converter 130, but the configuration is not limited thereto. That is, an electronic device may include a plurality of sub components with respective sub converters, and the number of sub converters may be varied depending on the number of sub components.

The main component 140 may include a main board (not shown) including a main controller such as a main controller unit (MCU) for generally controlling the display apparatus.

The sub component 150 may include a backlight of the display apparatus. Of course, the sub component 150 may further include a graphic generator, an audio processor, a communicator, etc. in addition to the backlight, or may alternatively include a graphic generator, an audio processor, a communicator, etc.

FIG. 3 is a circuit diagram of the power supply of FIG. 2 according to a first exemplary embodiment.

The power converter 110 may include a bridge rectifier 112 to rectify an AC voltage from an AC power 111 into a DC voltage, and a smoothing condenser 113 to smooth the rectified DC voltage. The smoothing condenser 113 may remove ripples from the DC voltage rectified by the bridge rectifier 112. The main component 140 includes a main controller (not shown) such as the MCU having a function of generally controlling the display apparatus, and therefore the display apparatus itself may be rebooted if the main component 140 is reset by a momentary power interruption or a voltage dip. Therefore, a voltage charged in the main converter 120 is supplied to the main component 140 when the momentary power interruption or voltage dip occurs in the input AC power 111, thereby preventing the main component 140 from being reset.

The main converter 120 may be connected to an output terminal of the power converter 110. The main converter 120 may include a first transformer 122 including a tertiary coil 123 to boost up and drop the rectified DC voltage received from the power converter 110, a first switch 124 to switch on and off the first transformer 122, and a main converter control IC 126 to control a pulse width modulation (PWM) signal to be transmitted to the first switch 124. The first switch 124 may be embodied by a semiconductor switching element such as the MOSFET.

The first transformer 122 generates an induced electromotive force in a secondary coil based on a voltage signal applied to a primary coil by a switching operation of the first switch 124, and transforms the induced electromotive force into a driving voltage for the main component (load) 140.

When a switching operation of the first switch 124 starts by a start-up circuit, the first transformer 122 operates by the first switch 124 and a voltage Vcc1 caused by the induced electromotive force generated in the tertiary coil 123 of the first transformer 122 is used as the input power for the main converter control IC 126. In result, the main converter control IC 126 normally generates a PWM signal and controls the first switch 124, so that the first transformer 122 can operate under control of the first switch 124, thereby supplying power to the main component 140.

The first switch 124 may control the transformer 122 to be switched on and off in response to a pulse width modulation (PWM) signal.

In some exemplary embodiments, the main converter control IC 126 may include a power control IC (e.g., a pulse width modulator (PWM) IC) configured to transmit the PWM signal to control the first switch 124.

The sub converter 130 may be connected to the output terminal of the power converter 110. The sub converter 130 may include a second transformer 132 including a tertiary coil 133 to boost up or drop the rectified DC voltage received from the power converter 110, a second switch 134 to switch on and off the second transformer 132, and a sub converter control IC 136 to control a PWM signal to be transmitted to the second switch 134. The second switch 134 may be achieved by a semiconductor switching element such as the MOSFET.

The second transformer 132 generates an induced electromotive force in a secondary coil based on a voltage signal applied to a primary coil by a switching operation of the second switch 134, and transforms the induced electromotive force into a driving voltage for the sub component (load) 150.

When a switching operation of the second switch 134 starts by a start-up circuit, the second transformer 132 operates by the second switch 134 and a voltage Vcc2 caused by the induced electromotive force generated in the tertiary coil 133 of the second transformer 132 is used as the input power for the sub converter control IC 136. The voltage Vcc2 may be the same as or different from the voltage Vcc1. In result, the main converter control IC 136 normally generates a PWM signal and controls the second switch 134, so that the second transformer 132 can operate under control of the second switch 134, thereby supplying power to the sub component 150.

The second switch 134 may control the transformer 132 to be switched on and off in response to a pulse width modulation (PWM) signal.

In some exemplary embodiments, the sub converter control IC 136 may include a power control IC (e.g., a pulse width modulator (PWM) IC) configured to transmit the PWM signal to control the second switch 134. The sub converter control IC 136 may have a brownout detection function to reliably take a low state when the momentary power interruption or the voltage dip occurs in the input AC power. The brownout detection function allows the sub converter control IC 136 to take a low state when an input voltage goes beyond a threshold operation range. As a result, if the momentary power interruption or the voltage dip occurs in the AC power, the sub converter control IC 136 transitions to a low state such that the sub converter control IC 136 continues to monitor the power from the smoothing condenser 113 of the power converter 110, but stops supplying the power to the sub component 150. Once the momentary power interruption or the voltage dip ends, the sub converter control IC 136 transitions back to the high state such that the sub converter control IC 136 restarts supplying power to the sub component 150.

Figure 4:
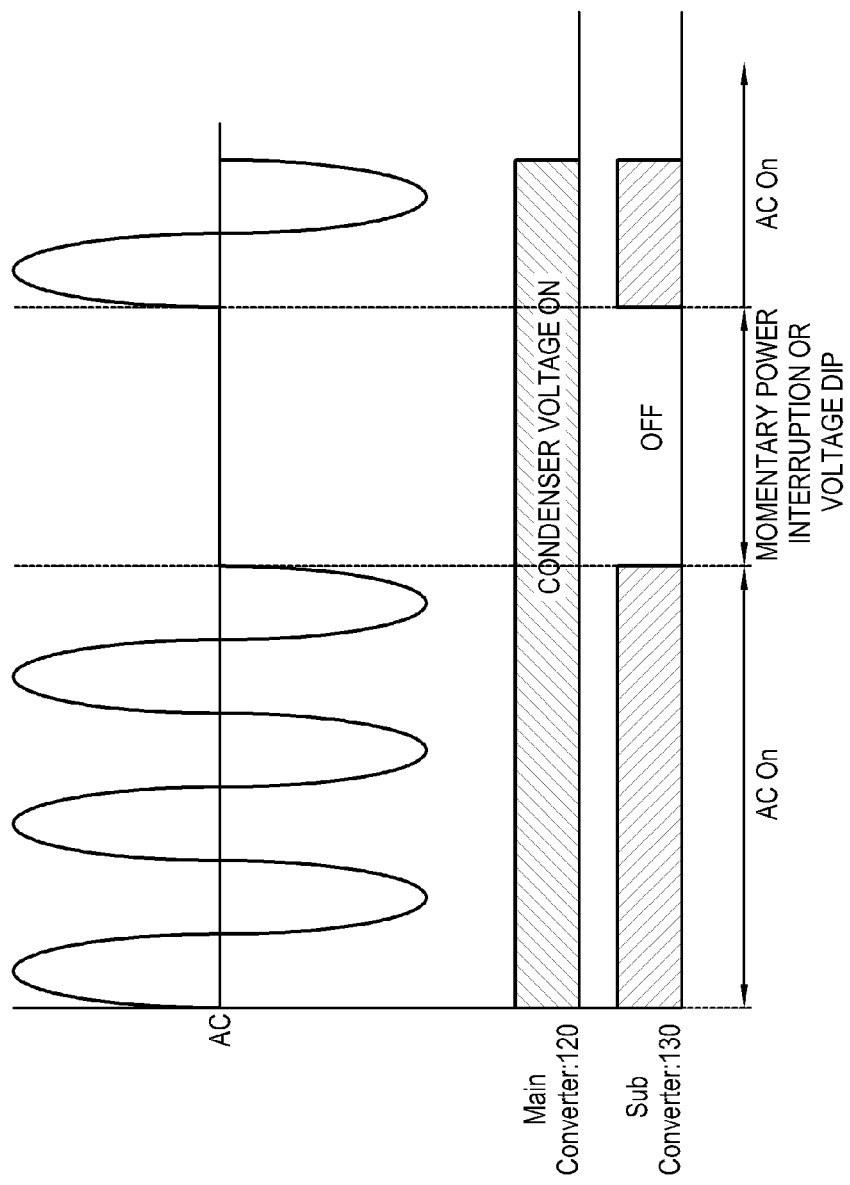
FIG. 4 is a view showing a waveform of AC power and operations of respective converters of the power supply of FIGS. 3 and 4 according to the first exemplary embodiment.

Thus, as shown in FIG. 4, if the momentary power interruption or the voltage dip occurs in the AC power, the main converter 120 keeps supplying voltage to the main component 140, but the sub converter 130 stops supplying voltage to the sub component 150 by the brownout detection function of the sub converter control IC 136.

Figure 5:
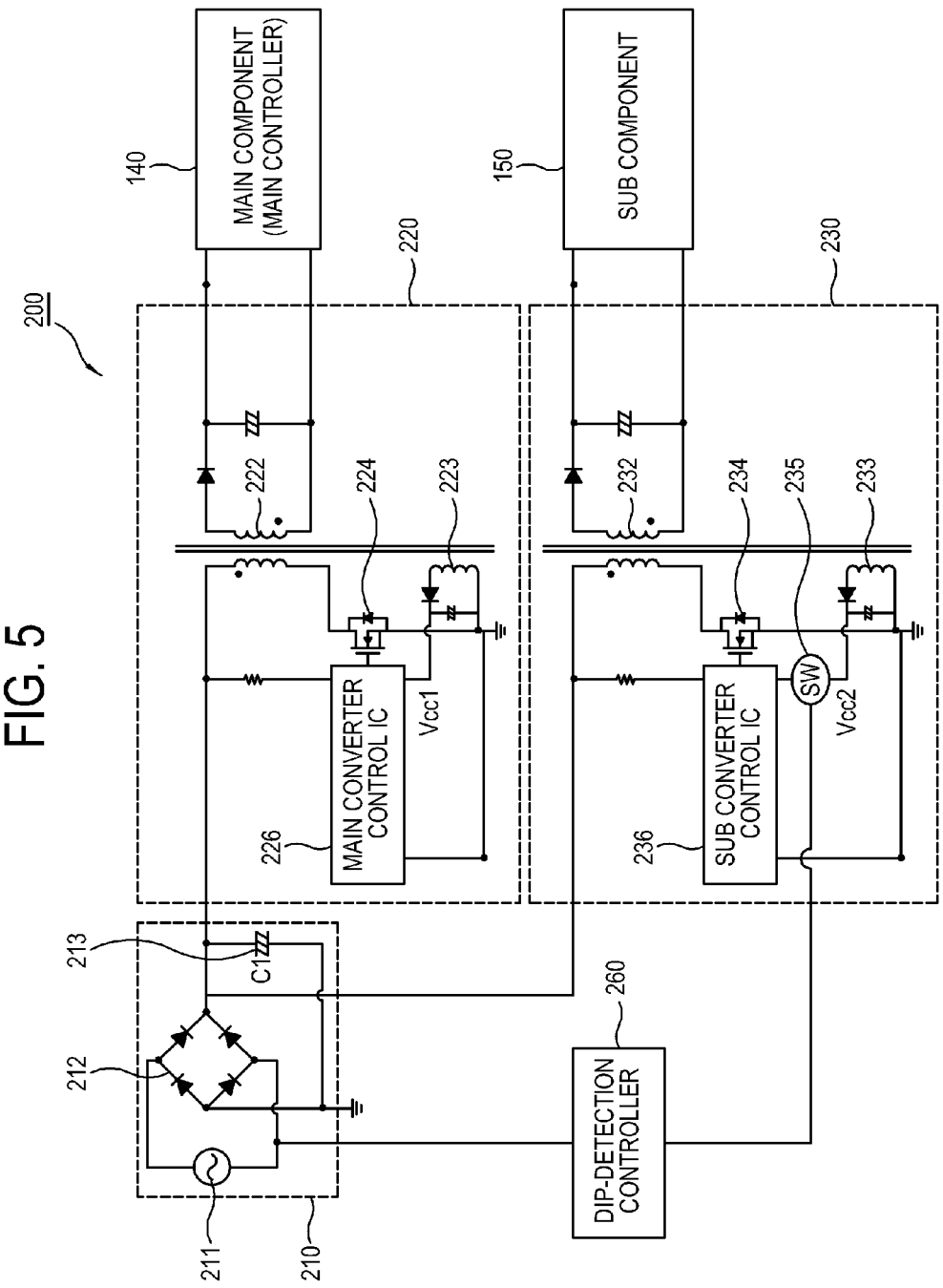
FIG. 5 is a circuit diagram of a power supply according to a second exemplary embodiment.

FIG. 5 is a circuit diagram showing a power supply according to a second exemplary embodiment. Referring to FIG. 5, a power supply 200 may include a power converter 210, a main converter 220 to supply power to the main component 140 of the display apparatus, a sub converter 230 to supply power the sub component 150 of the display apparatus, and a dip-detection controller 260 for controlling a switch (SW) 235 that switches on and off the input voltage Vcc2 of the control IC 236 of the sub converter 230.

The power converter 210 may include a bridge rectifier 212 to rectify an AC voltage from AC power 211 into a DC voltage, and a smoothing condenser 213 to smooth the rectified DC voltage. The smoothing condenser 213 may remove ripples from the DC voltage rectified by the bridge rectifier 212. The main component 140 includes a main controller (not shown) such as the MCU that serves to generally control the display apparatus, and therefore the display apparatus itself may be rebooted if the main component 140 is reset by a momentary power interruption or a voltage dip. Therefore, the voltage charged in the main converter 220 is supplied to the main component 140 when the momentary power interruption or the voltage dip occurs in the input AC power 211, thereby preventing the main component 140 from being reset.

The main converter 220 may be connected to an output terminal of the power converter 210. The main converter 220 may include a first transformer 222 including a tertiary coil 223 to boost up or drop the rectified DC voltage received from the power converter 210, a first switch 224 to switch on and off the first transformer 222, and a main converter control IC 226 to control a PWM signal to be supplied to the first switch 224. The first switch 224 may be achieved by a semiconductor switching element such as the MOSFET.

The first transformer 222 generates an induced electromotive force in a secondary coil based on a voltage signal applied to a primary coil by a switching operation of the first switch 224, and transforms the induced electromotive force into a driving voltage needed for the main component 140.

When a switching operation of the first switch 224 starts by a start-up circuit, the first transformer 222 operates by the first switch 224 and a voltage Vcc1 caused by the induced electromotive force generated in the tertiary coil 223 of the first transformer 222 is used as the input power for the main converter control IC 226. As a result, the main converter control IC 226 normally generates a PWM signal and controls the first switch 224, so that the first transformer 222 can operate under control of the first switch 224, thereby supplying power to the main component 140.

The first switch 224 may control the first transformer 222 to be switched on and off in response to a pulse width modulation (PWM) signal.

In some exemplary embodiments, the main converter control IC 226 may include a power control IC (e.g., a pulse width modulator (PWM) IC) configured to transmit the PWM signal to control the first switch 224.

The sub converter 230 may be connected to the output terminal of the power converter 210. The sub converter 230 may include a second transformer 232 including a tertiary coil 233 to boost up or drop the rectified DC voltage received from the power converter 210, a second switch 234 to switch on and off the second transformer 232, a sub converter control IC 236 to control a PWM signal to be transmitted to the second switch 234, and a power switch 235 to switch on/off the input voltage Vcc2 of the sub converter control IC 236. The second switch 234 may be achieved by a semiconductor switching element such as the MOSFET.

The second transformer 232 generates an induced electromotive force in a secondary coil based on a voltage signal applied to a primary coil by a switching operation of the second switch 234, and transforms the induced electromotive force into a driving voltage needed for the main component (load) 150.

When a switching operation of the second switch 234 starts by a start-up circuit, the second transformer 232 operates by the second switch 234 and a voltage Vcc2 caused by the induced electromotive force generated in the tertiary coil 233 of the second transformer 232 is used as the input power for the sub converter control IC 236. As a result, the main converter control IC 236 normally generates a PWM signal and controls the second switch 234, so that the second transformer 232 can operate under control of the second switch 234, thereby supplying power to the sub component 150. The voltage Vcc2 may be the same as or different from the voltage Vcc1.

The second switch 234 may control the transformer 232 to be switched on and off in response to a pulse width modulation (PWM) signal.

In some exemplary embodiments, the sub converter control IC 236 may include a power control IC (e.g., a pulse width modulator (PWM) IC) configured to transmit the PWM signal to control the second switch 234.

The power switch 235 arranged in a power input terminal of the sub converter control IC 236 may control the input voltage of the sub converter control IC 236 to be switched on/off under control of the dip-detection controller 260. The power switch 235 may be achieved by a switching element such as a MOSFET.

The dip-detection controller 260 may be arranged in between the AC power 211 and the power switch 235 of the sub converter 230. The dip-detection controller 260 may detect whether a momentary power interruption or a voltage dip occurs in the AC power 211. If the dip-detection controller 260 detects the momentary power interruption or the voltage dip in the AC power 211, the dip-detection controller 260 controls the switch 235 to turn off the power switch 235 of the sub converter 230 so as not to operate the sub converter control IC 236 of the sub converter 230. It is noted that the sub converter 230 in this exemplary embodiment is provided with the power switch 235, and that in the case of a plurality of sub converters 230 and respective sub components 150, a plurality of power switches 235 may also be provided. However, this is only an example, and it is also contemplated to provide a single power switch 235 that controls the voltage to a plurality of sub converter control ICs 236.

As a result, when a momentary power interruption or a voltage dip occurs in the AC power, the sub converter control IC 236 is not supplied with the voltage and therefore stops operating, such that the sub converter 230 stops supplying power to the sub component 150.

Figure 6:
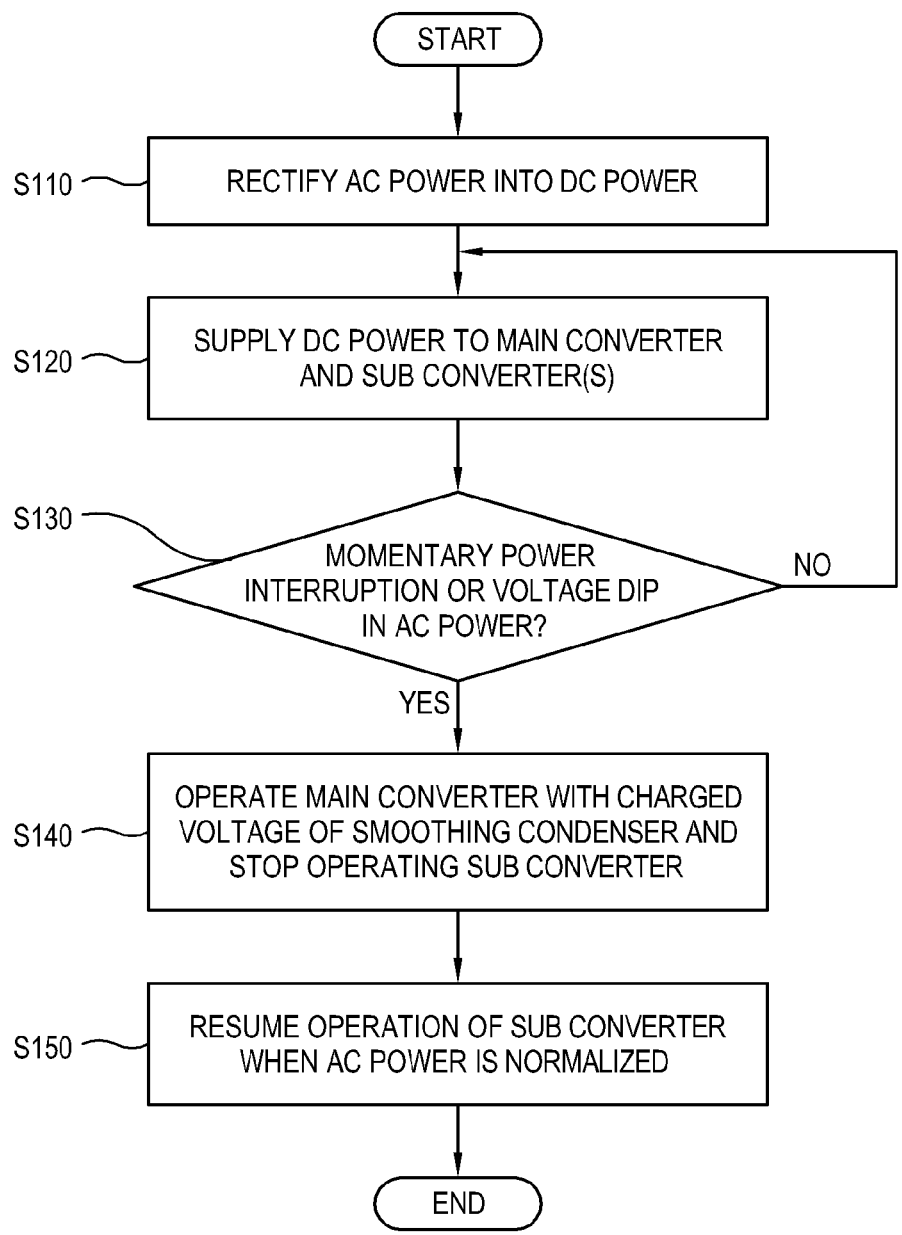
FIG. 6 is a flowchart illustrating a power supply method according to an exemplary embodiment.

Below, a power supply method according to an exemplary embodiment will be described with reference to FIG. 6.

At operation S110, the bridge rectifier 112 rectifies an input AC voltage into a DC voltage.

At operation S120, the output voltage of the bridge rectifier 112, 212 is supplied to the main component 140 including the main controller of the display apparatus by the main converter 120, 220. Further, the output voltage of the bridge rectifier 112, 212 is supplied to at least one of the sub components 150 by at least one of the sub converters 130, 230.

At operation S130, the sub converter control IC 136 or the dip-detection controller 260 determines whether a momentary power interruption or a voltage dip occurs in the AC power 111, 211.

At operation S140, when it is determined that a momentary power interruption or a voltage dip occurs in the AC power 111, 211 (operation S130: YES), the power switch 235 arranged in the power input terminal of the sub converter control IC 236 is switched off. It is noted that alternatively the power switch 235 may be controlled to supply a voltage to the sub converter control IC 236 to set the sub converter control IC 236 into the low state as in the above exemplary embodiment.

Lastly, at operation S150, when the AC power 111, 211 is normalized (e.g., the interruption or the voltage dip ends), the sub converter 130, 230 resumes supplying power to the sub component 150. In other words, the power switch 235 arranged in the power input terminal of the sub converter control IC 236 is switched on, or alternatively the power switch 235 may be controlled to supply a voltage to the sub converter control IC 236 to set the sub converter control IC 236 into the high state as in the above exemplary embodiment.

When the momentary power interruption or the voltage dip occurs in the AC power 111, 211, the sub converter 130, 230 stops supplying power to the sub component so that the smoothing condenser 113, 213 of the power converter 110, 210 supplies power only to the main converter 120, 220. In result, it is economical since the smoothing condenser 113, 213 can have a low capacitance. Further, it is possible to lower the inrush current and thus prevent damage of the components such as the PFC.

As described above, the method and apparatus for supplying power according to an exemplary embodiment is economically feasible since it is possible to effectively reduce the effect of a momentary power interruption or a voltage dip even though the smoothing condenser with low specifications is used.

Further, the method and apparatus for supplying power according to an exemplary embodiment is effective in preventing the components from damage due to the inrush current since only the main converter draws power from the smoothing condenser.

Although a few exemplary embodiments have been shown and described, it will be appreciated by those skilled in the art that changes may be made in these exemplary embodiments without departing from the principles and spirit of the present inventive concept. Therefore, the foregoing is to be considered as illustrative only. The scope of the present inventive concept is defined in the appended claims and their equivalents. Accordingly, all suitable modification and equivalents may fall within the scope of the present inventive concept.

What is claimed is:

1. An apparatus for supplying power to an electronic device, the apparatus comprising:
　a power converter comprising a rectifier configured to convert alternating current (AC) power into direct current (DC) power, and a smoothing condenser connected to an output terminal of the rectifier;
　a main converter that is connected with an output terminal of the power converter and configured to supply power to a first component of the electronic device; and
　at least one sub converter that is connected with the output terminal of the power converter, and configured to supply power to components other than the first component and to stop supplying the power in response to a momentary power interruption or a voltage dip occurring in the AC power,
　wherein the at least one sub converter comprises:
　a transformer configured to transform an output voltage of the power converter;
　a switch configured to switch on and off the transformer; and
　a control integrated circuit (IC) configured to control the switch, and change to a low state in response to the momentary power interruption or the voltage dip occurring in the AC power.

2. The apparatus according to claim 1, wherein the main converter is supplied with voltage charged in the smoothing condenser in response to the momentary power interruption or the voltage dip occurring in the AC power.

3. The apparatus according to claim 1, further comprising a dip-detection controller configured to detect whether the momentary power interruption or the voltage dip occurs in the AC power, and to switch the input power of the control IC of the sub converter to a low state in response to detecting that the momentary power interruption or the voltage dip occurs in the AC power.

4. The apparatus according to claim 1, further comprising a dip-detection controller configured to detect whether the momentary power interruption or the voltage dip occurs in the AC power, and to switch off the input power of the control IC of the sub converter to turn off the sub converter in response to detecting that the momentary power interruption or the voltage dip occurring in the AC power.

5. A method of supplying power to an electronic device, the method comprising:
　rectifying input alternating current (AC) power into direct current (DC) power;
　supplying rectified voltage to a first component of the electronic device;
　supplying the rectified voltage to components of the electronic device other than the first component; and
　stopping the supply of the rectified voltage to the components other than the first component in response to a momentary power interruption or a voltage dip occurring in the AC power,
　wherein the supplying the rectified voltage to the components other than the first component comprises transforming the rectified voltage to a voltage supplied to the components other than the first component using a transformer, and
　wherein the stopping the supply comprises controlling a switch to switch on and off the transformer according to whether the momentary power interruption or the voltage dip occurs in the AC power.

6. The method according to claim 5, wherein the rectifying comprises charging a smoothing condenser, and
　the method further comprises supplying the voltage charged in the smoothing condenser to the first component of the electronic device in response to the momentary power interruption or the voltage dip occurring in the AC power.

7. The method according to claim 5, wherein the switch is controlled to switch off the transformer in response to the momentary power interruption or the voltage dip occurring in the AC power.

8. The method according to claim 5, further comprising:
　detecting whether the momentary power interruption or voltage dip occurs in the AC power, and
　stopping the supply comprises switching off input power of a control IC that supplies the rectified voltage to the components other than the first component in response to detecting that the momentary power interruption or the voltage dip occurs in the AC power.

9. An apparatus for supplying power to an electronic device, the apparatus comprising:
　a power converter;
　a main converter that is connected to an output terminal of the power converter and configured to supply power to a main component of the electronic device; and
　at least one sub converter that is connected to the output terminal of the power converter, and configured to supply power to a sub component of the electronic device,
　wherein during a momentary power interruption in power supplied from the power converter to the main converter and the at least one sub converter, the main converter is configured to supply power to the main component while the at least one sub converter stops supplying power to the sub component,
　wherein the apparatus further comprises a dip-detection controller configured to detect the momentary power interruption,
　wherein the at least one sub converter comprises a control integrated circuit (IC) configured to control the supply of power to the sub component, and
　wherein the dip-detection controller is configured to, in response to detecting the momentary power interruption, control the control IC to stop supplying power to the sub component.

10. The apparatus according to claim 9, wherein the momentary power interruption comprises a dip in an output voltage of the power converter.

11. The apparatus according to claim 9, wherein the power converter comprises a smoothing condenser configured to store power produced by power converter, and
　during the momentary power interruption, the main converter is configured to supply power stored in the smoothing condenser to the main component.

12. The apparatus according to claim 9, wherein the at least one sub converter comprises a control integrated circuit (IC) configured to control the supply of power to the sub component, and to detect the momentary power interruption.

13. The apparatus according to claim 12, wherein the control IC is configured to, in response to detecting the momentary power interruption, enter a low state to stop supplying power to the sub component.

14. The apparatus according to claim 9, wherein the dip-detection controller is configured to control the control IC to stop supplying power to the sub component by setting the control IC to a low state.

15. The apparatus according to claim 9, wherein the dip-detection controller is configured to control the control IC to stop supplying power to the sub component by turning off power to the control IC.

* * * * *